United States Patent
Wieger et al.

(10) Patent No.: US 6,766,637 B2
(45) Date of Patent: Jul. 27, 2004

(54) BATTLE OVERRIDE VALVE

(75) Inventors: George S. Wieger, Niles, MI (US); David W. Rice, Niles, MI (US)

(73) Assignee: Honeywell International Inc., Morristown, NJ (US)

( * ) Notice: Subject to any disclaimer, the term of this patent is extended or adjusted under 35 U.S.C. 154(b) by 30 days.

(21) Appl. No.: 10/191,362

(22) Filed: Jul. 8, 2002

(65) Prior Publication Data
US 2004/0003597 A1 Jan. 8, 2004

(51) Int. Cl.[7] .................................................. F02C 9/28
(52) U.S. Cl. ...................................... 60/39.281; 60/734
(58) Field of Search .............................. 60/39.281, 734

(56) References Cited

U.S. PATENT DOCUMENTS

| | | |
|---|---|---|
| 3,202,161 A | 8/1965 | Richards |
| 3,419,246 A | 12/1968 | Burgess |
| 4,077,203 A | 3/1978 | Burnell |
| 4,281,509 A * | 8/1981 | La Grone ................ 60/39.281 |
| 4,334,406 A | 6/1982 | Todd |
| 4,893,599 A | 1/1990 | Melnik et al. |
| 5,154,221 A | 10/1992 | Vatant et al. |
| 5,245,967 A | 9/1993 | Reuter |

* cited by examiner

Primary Examiner—Louis J. Casaregola
(74) Attorney, Agent, or Firm—Larry J. Palguta

(57) ABSTRACT

A fuel control system, battle override valve and a method of controlling bypass fuel in a fuel system are disclosed. A battle override valve 30 for an engine fuel system 10 includes a metering valve 50 having a rate limiting function providing for control of a slew rate during an operation of the battle override valve 30. A transfer valve 70 having a manual fuel control operating position and a normal fuel control operating position permits a flow of fuel between the metering valve 50 and the transfer valve 70. The transfer valve 70 is controlled between the normal fuel control operating position and the manual fuel control operating position in order to regulate a flow of fuel during a manual or bypass fuel system 10 operation.

9 Claims, 15 Drawing Sheets

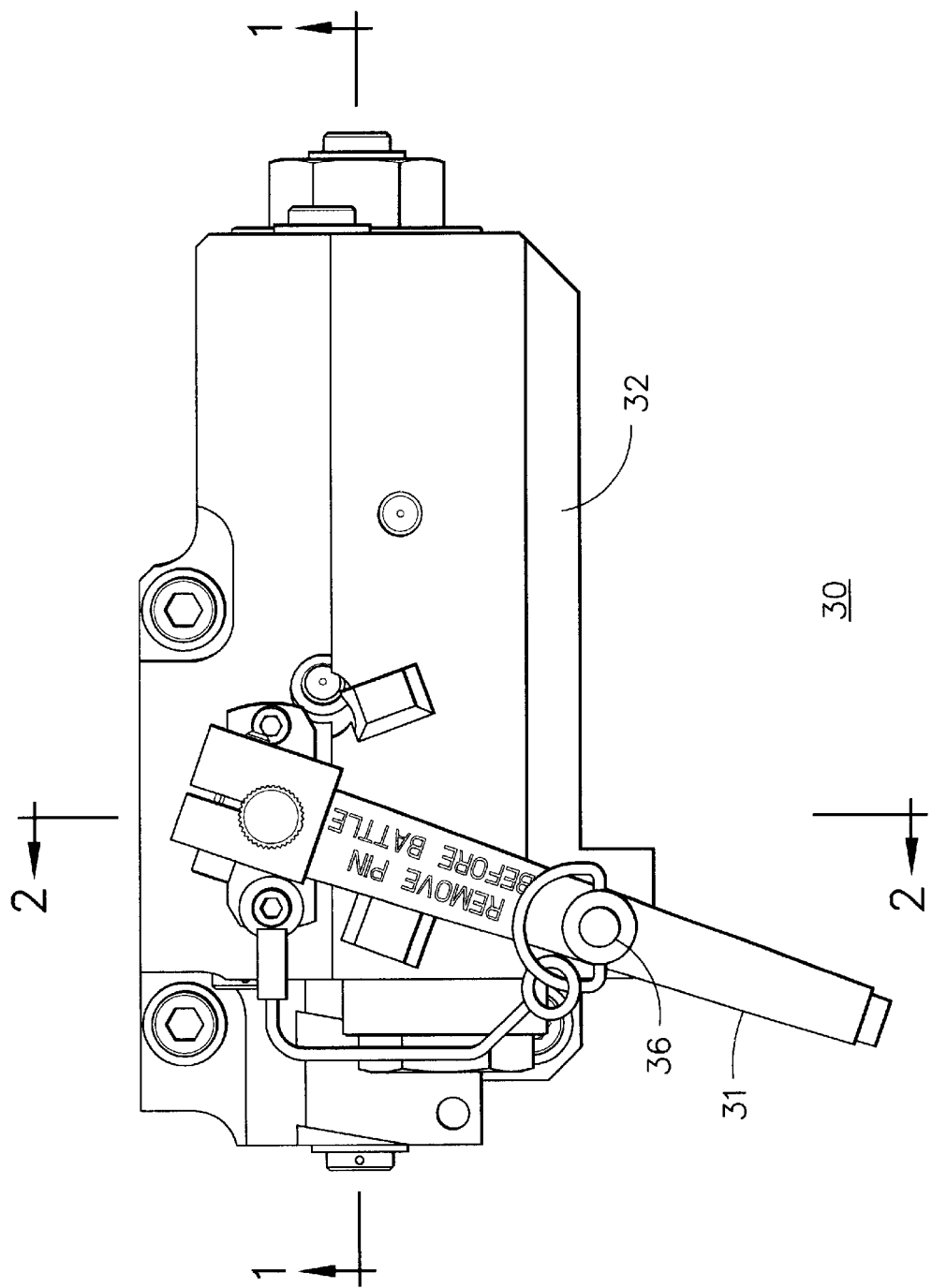

BATTLE OVERRIDE VALVE

This invention was made with Government support under Contract No. DAAE07-00-C-N086 awarded by the United States Army. The Government has certain rights in this invention.

TECHNICAL FIELD AND INDUSTRIAL APPLICABILITY OF THE INVENTION

The present invention is generally directed to a modular override valve for a fuel system for an engine, and more particularly to a battle override valve for operating an engine during an electrical or main fuel control system failure.

BACKGROUND OF THE INVENTION

It is desirable in the background art of fuel systems to provide a manual bypass or override control function in order to provide backup or supplementary control of engine fuel systems during or subsequent to electronic or system failures, particularly in fuel systems for military vehicles.

U.S. Pat. No. 4,893,599 to Melnik et al., the entirety of which is hereby incorporated by reference, describes a manual bypass mechanism for an electronic fuel injection device on a military vehicle such as a tank. The mechanism described in the Melnik et al. patent is designed for use in an electronically controlled fuel system employing an electronic fuel unit (ECU) for a tank. As described by Melnik et al., the ECU is programmed to initiate several protective modes and reduces fuel flow from the HMU (Hydromechanical Unit) if certain performance irregularities occur in the engine, transmission, or other propulsion system component in order to prevent engine damage.

In one of the protective modes, referred to as "protective mode III", the flow rate of fuel to the engine is reduced to about 120 lbs./hour, so the engine generates only about 72 hp, or 5 percent of its capacity. The tank must move very slowly, e.g., at 1 mph, to a site where the propulsion system's problem can be analyzed. In a battle or emergency scenario, it may be necessary to drive the tank faster than protective mode III permits. Further, it is possible that battle damage could cut off electrical power to the ECU and thereby adversely limit fuel flow to the engine.

The mechanism described by Melnik includes a completely mechanical fuel bypass device which routes additional fuel to the engine during protective mode III or during failure of the ECU. The device was a modular, add-on unit that can be installed on existing tanks without disassembly of the hydromechanical units and which can be used without modifying the logic of the ECUs.

However, the present inventors have determined that systems of the background art, including that described in the Melnik et al. patent, suffer from several shortcomings. Specifically, the Melnik device requires a screw-type metering valve/metering shaft for controlling fuel flow between a zero-flow position to a fully open position. In addition, the systems of the background art fail to include adequate consideration for protecting against engine overspeed and high temperatures when fuel control is shifted to the manual bypass device.

SUMMARY OF THE PRESENT INVENTION

The present invention overcomes the shortcomings associated with the background art and achieves other advantages not realized by the background art.

The present invention, in part, is a recognition by the present inventors that a rate limiting function can be advantageously employed in a battle override valve for a fuel system of an engine.

The present invention, in part, is a recognition by the present inventors that a manually operated bypass fuel control valve incorporating fuel metering and fuel flow rate limiting functions will assist in avoiding excessive engine overspeeding and/or overheating conditions during manual operation, e.g. bypass fuel control.

The present invention, in part, is recognition by the present inventors that a minimum slew rate provided by a bypass fuel control valve will provide a smooth transition between manual (bypass) and automatic fuel system control while simultaneously preventing undesirable engine shutoff or stalling.

One or more of the foregoing aspects of the present invention is accomplished, in part, by a bypass fuel control device for an engine fuel system comprising a metering valve having a rate limiting device, wherein the rate limiting device provides for control of a slew rate during an operation of the battle override valve; a transfer valve having a manual fuel control operating position and a normal fuel control operating position, wherein the manual fuel control operating position permits a flow of fuel between the metering valve and the transfer valve; and a control device controlling a movement of the transfer valve between the normal fuel control operating position and the manual fuel control operating position.

One or more of the foregoing aspects of the present invention is also accomplished, in part, by a bypass fuel control device for a manual operation of an engine fuel system comprising a metering valve having a rate limiting device, wherein said rate limiting device provides for control of a fuel delivery rate during an operation of the battle override valve; a spool and a sleeve valve device for controlling a metered fuel flow of the metering valve; a low pressure bleed assembly within said metering valve; and a control spring, wherein said low pressure bleed assembly and said control spring provide said rate limiting effect for controlling said fuel delivery rate.

One or more of the foregoing aspects of the present invention is also accomplished, in part, by a fuel control system for an engine, the fuel control system comprising a fuel supply; a fuel pump providing a supply of fuel to the engine; an electronic flow control system providing an automatic operation of the fuel system during a normal engine operation; a fuel output to the engine; and a bypass fuel control device providing a manual operation of the fuel system during a bypass engine operation, the bypass fuel control device including a metering valve having a rate limiting device, wherein the rate limiting device provides for control of a slew rate during an operation of the bypass fuel control device, a transfer valve controlling a supply and a return of fuel respectively to and from the metering valve, and a control device controlling a position of the transfer valve between a normal operating position and a bypass operating position.

One or more of the foregoing aspects of the present invention is accomplished, in part, by a method of controlling a bypass fuel supply for an engine fuel control system having the aforementioned bypass fuel control device, the method comprising the steps of controlling the bypass fuel supply flow with the metering valve, wherein an increase in the bypass fuel supply flow is delayed by the rate limiting effect of the metering valve; and controlling the fuel supply and return of respectively to and from the metering valve with the transfer valve.

BRIEF DESCRIPTION OF THE DRAWINGS

The present invention will become more fully understood from the detailed description given hereinafter and the accompanying drawings which are given by way of illustration only, and thus do not limit the present invention.

FIG. 3(b) is a plan view of the battle override valve shown in FIG. 1;

DETAILED DESCRIPTION OF THE PREFERRED EMBODIMENTS

Figure 1:
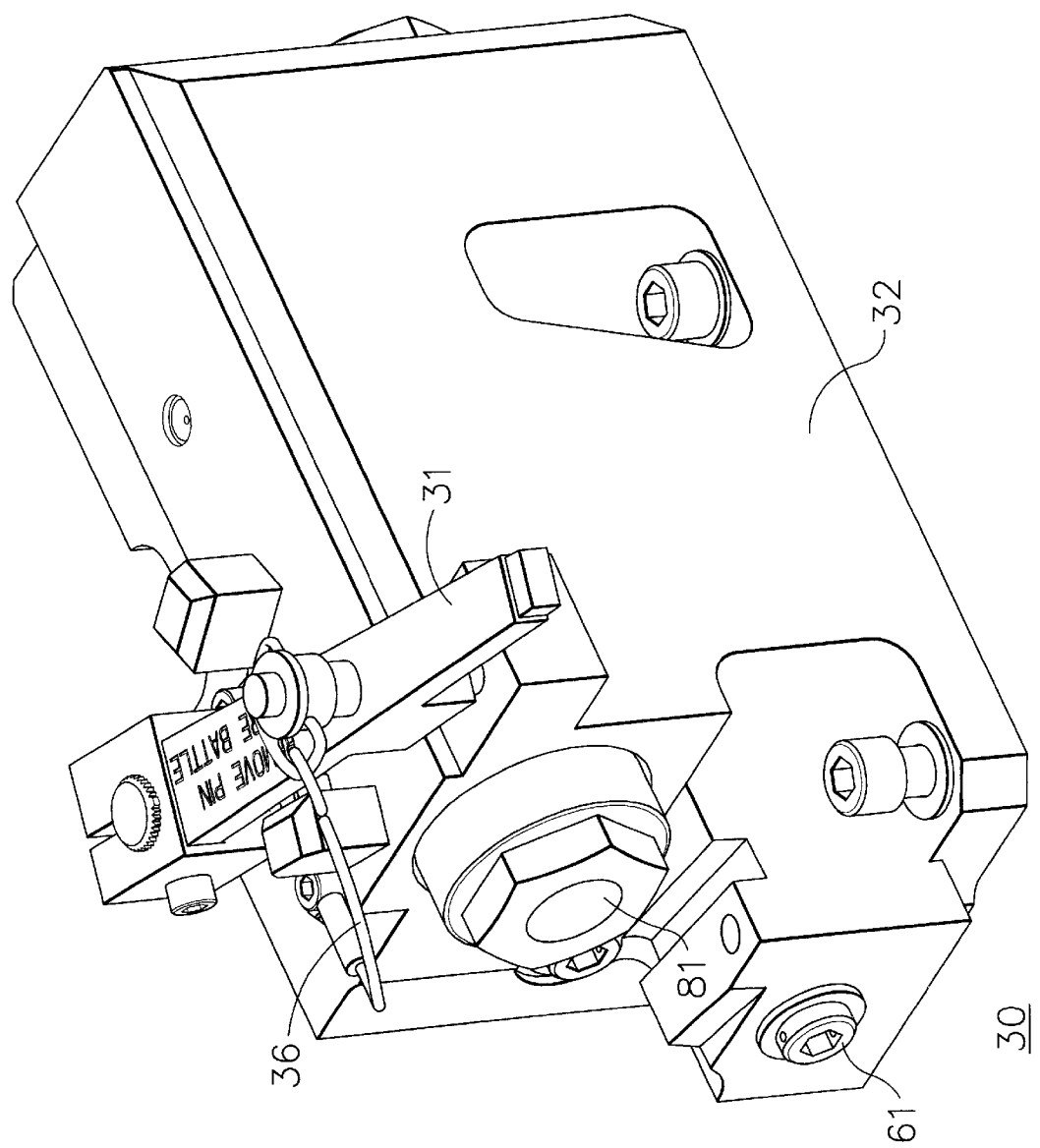
FIG. 1 is an isometric view of a battle override valve according to an embodiment of the present invention.
Figure 2:
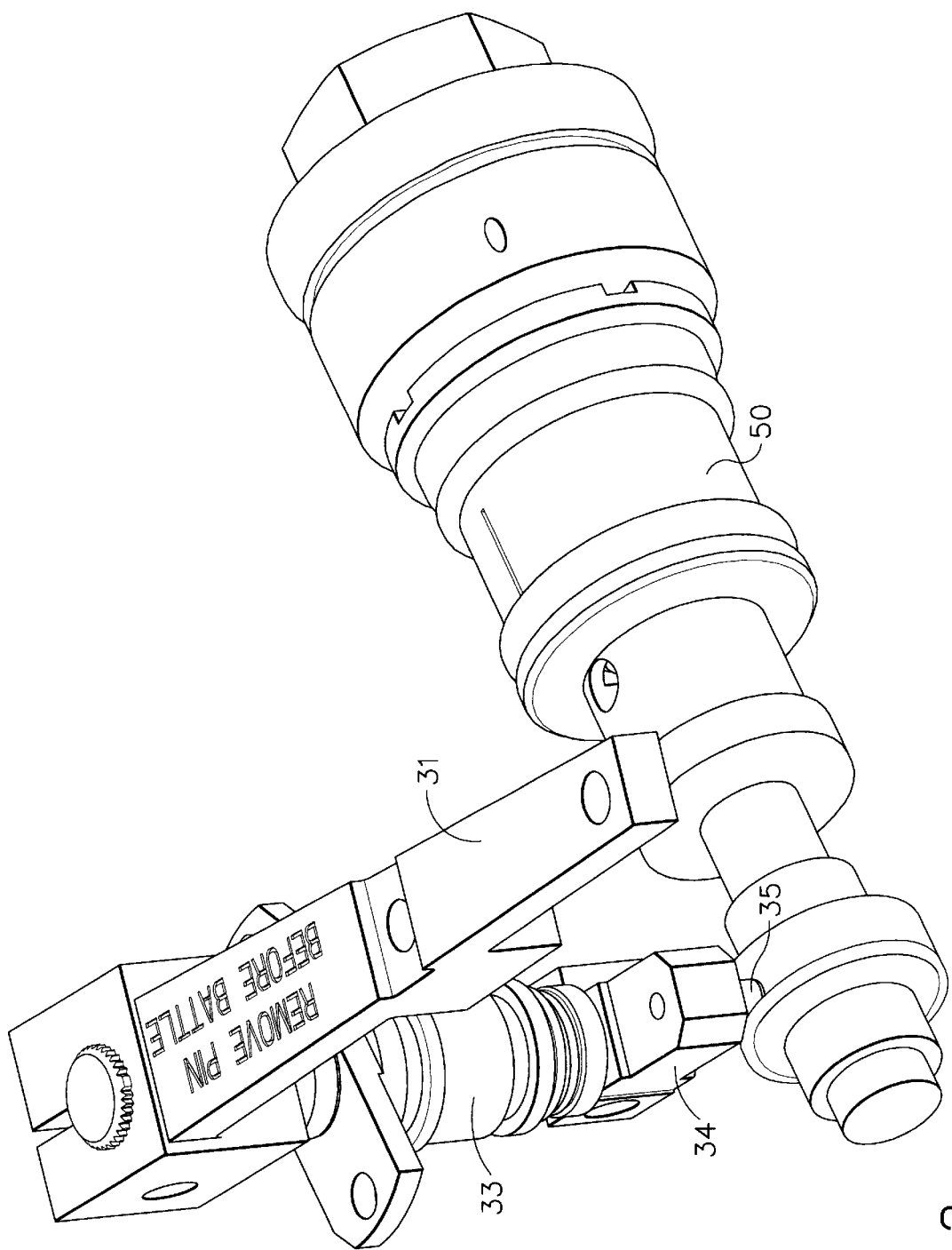
FIG. 2 is an isometric view of a metering valve of the battle override valve shown in FIG. 1.
Figure 3A:
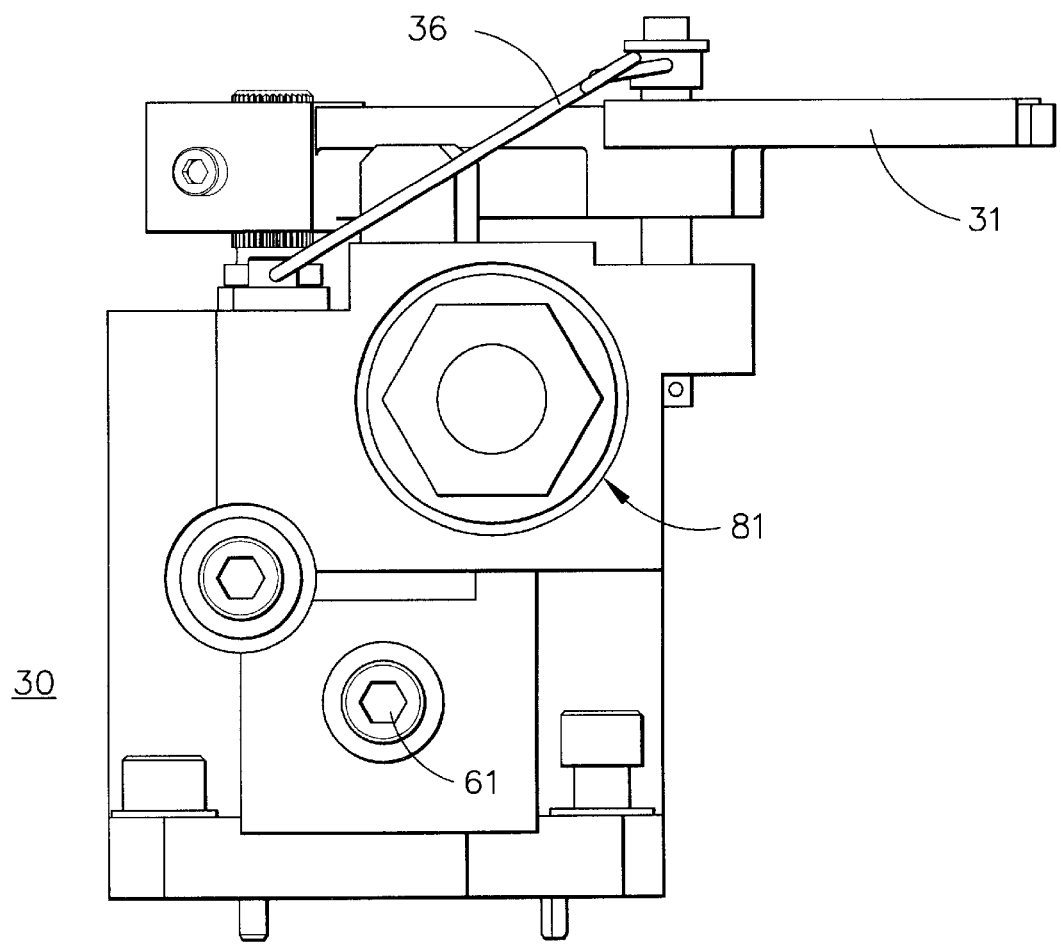
FIG. 3(a) an end view of the battle override valve shown in FIG. 1.
Figure 3C:
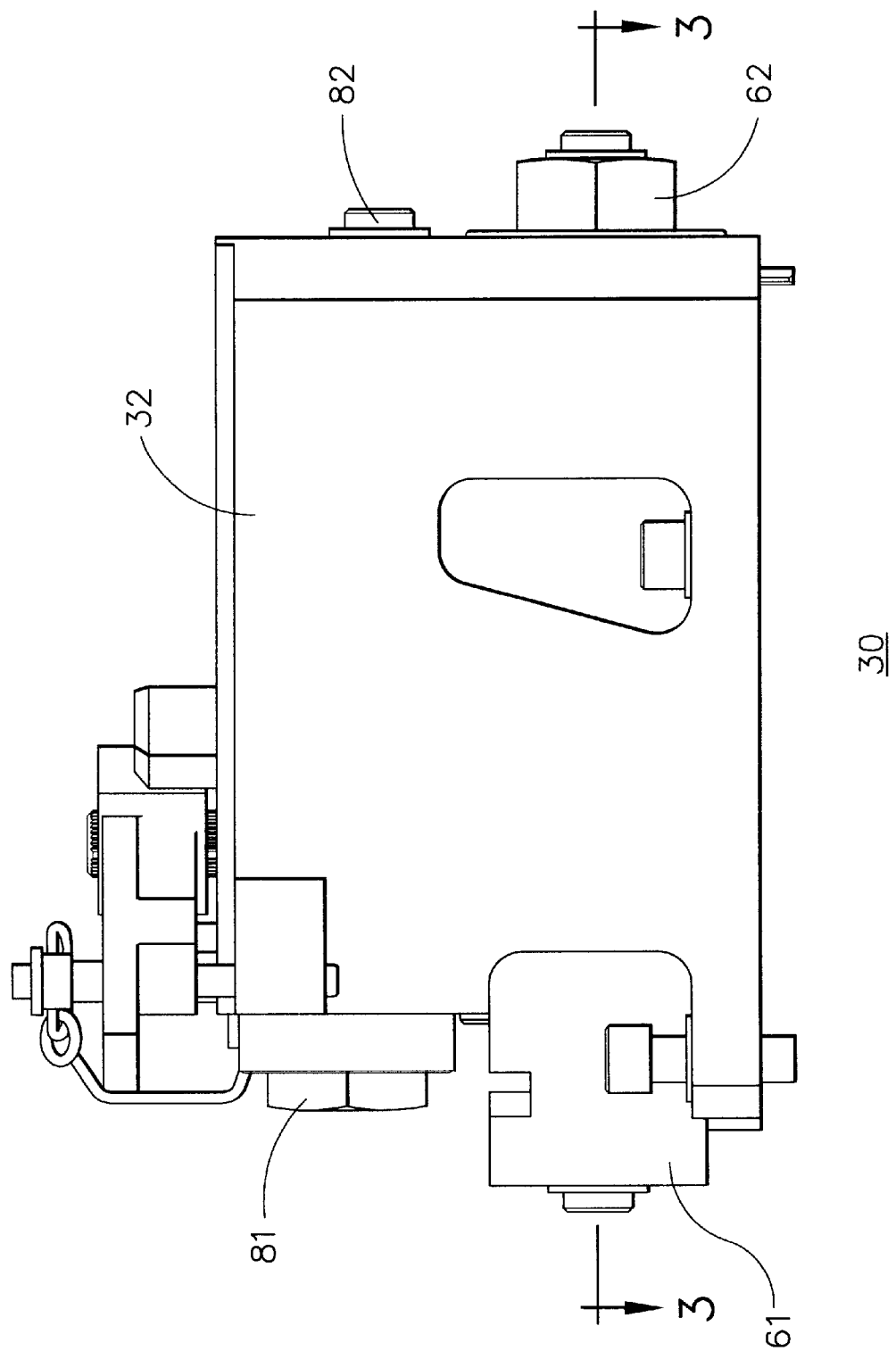
FIG. 3(c) is a side view of the battle override valve shown in FIG. 1.
Figure 4:
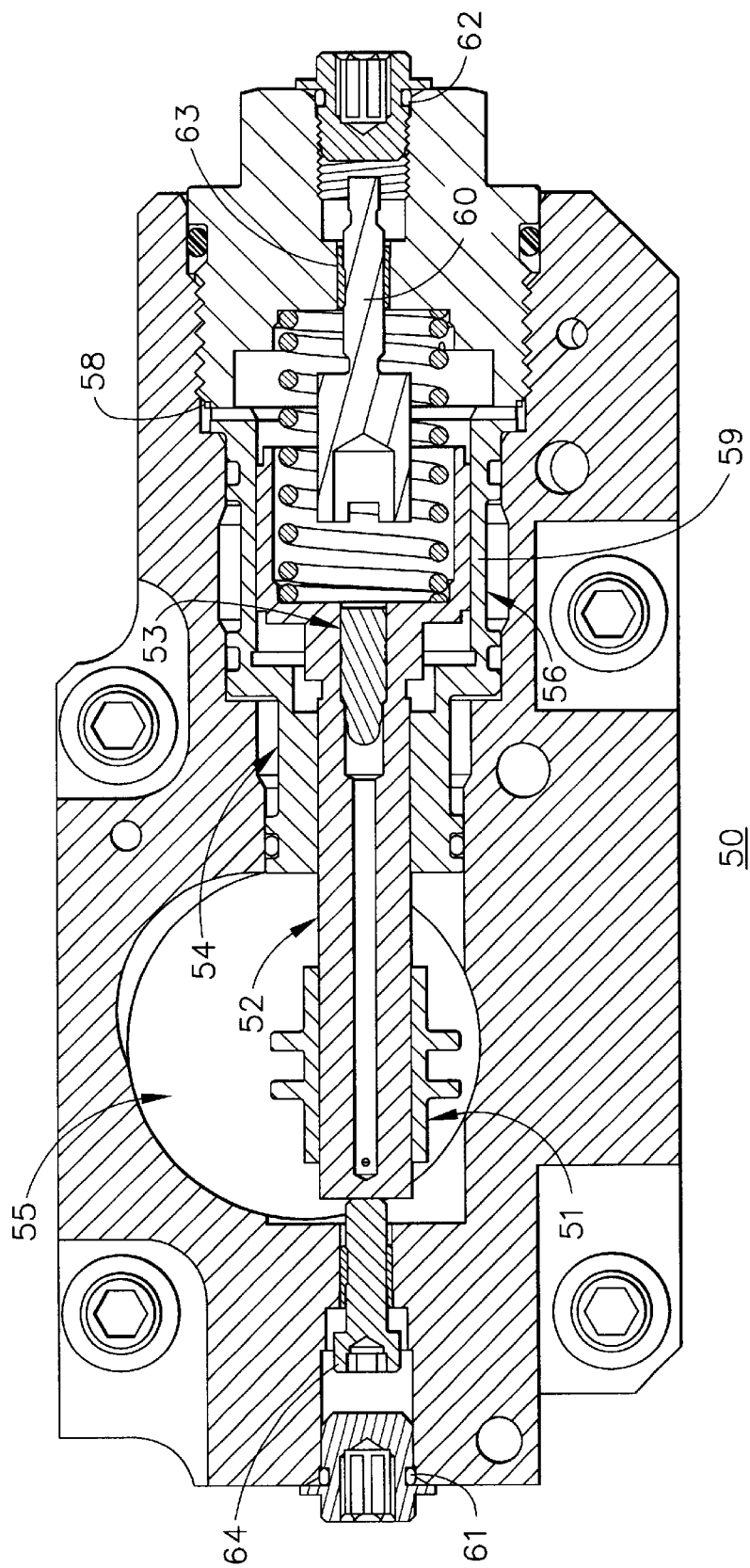
FIG. 4 is a cross-sectional view of the battle override valve of the present invention taken along line 3—3 in FIG. 3(c)
Figure 5:
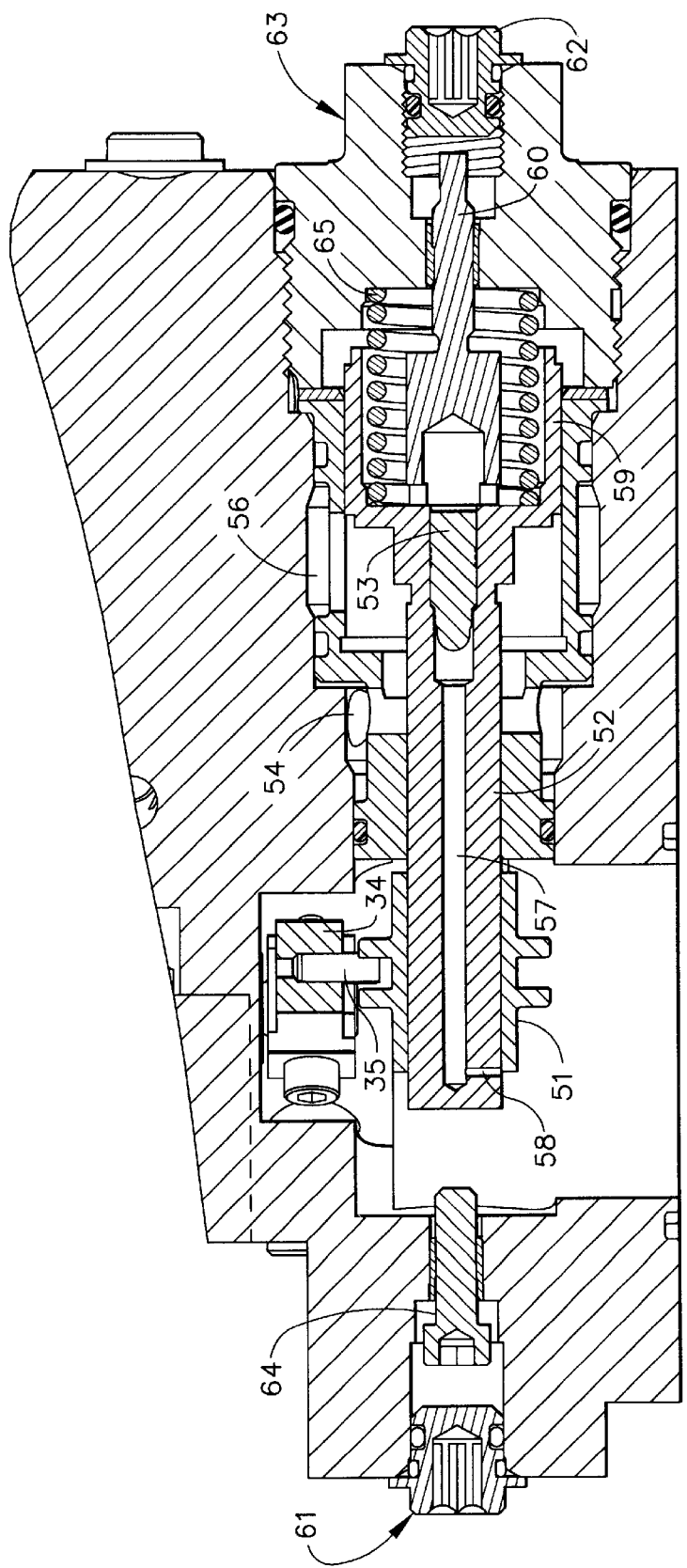
FIG. 5 is a cross-sectional view of the battle override valve of the present invention taken along line 1—1 in FIG. 3(b) during a maximum fuel flow stop operating position.
Figure 6:
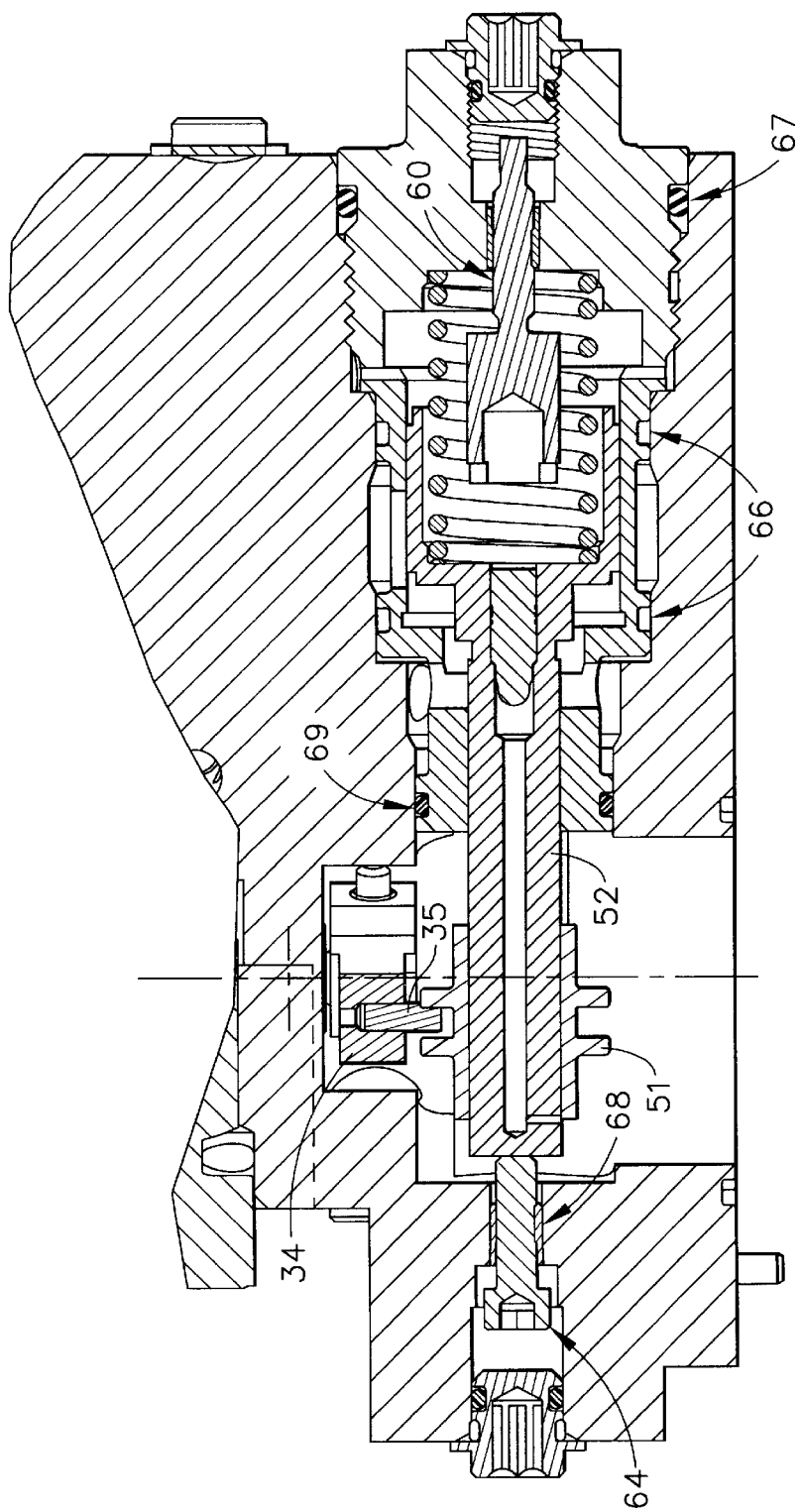
FIG. 6 is a cross-sectional view of the battle override valve of the present invention taken along line 1—1 in FIG. 3(b) during a minimum fuel flow stop operating position.

The present invention will now be described in detail with reference to the accompanying drawings. FIG. 1 is an isometric view of a battle override valve according to an embodiment of the present invention. FIG. 2 is an isometric view of a metering valve of the battle override valve shown in FIG. 1. FIG. 3(a) an end view of the battle override valve shown in FIG. 1. FIG. 3(b) is a plan view of the battle override valve shown in FIG. 1. FIG. 3(c) is a side view of the battle override valve shown in FIG. 1. FIG. 4 is a cross-sectional view of a metering valve of the present invention taken along line 3—3 in FIG. 3(c). FIG. 5 is a cross-sectional view of a metering valve of the present invention taken along line 1—1 in FIG. 3(b) during a maximum fuel flow stop operating position. FIG. 6 is a cross-sectional view of a metering valve of the present invention taken along line 1—1 in FIG. 3(b) during a minimum fuel flow stop operating position.

Figure 7:
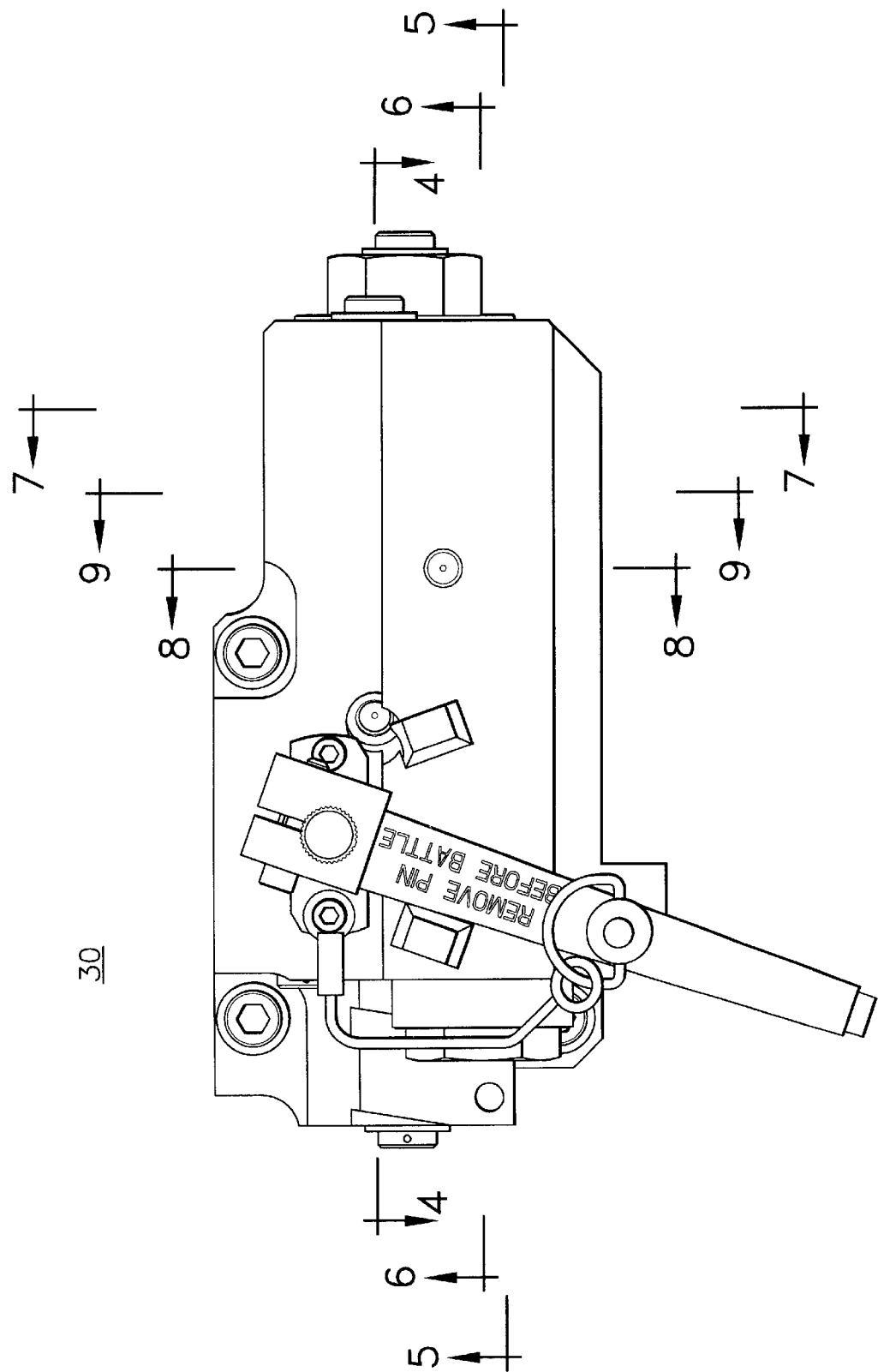
FIG. 7 is a plan view of the battle override valve of the present invention shown in FIG. 1.
Figure 8:
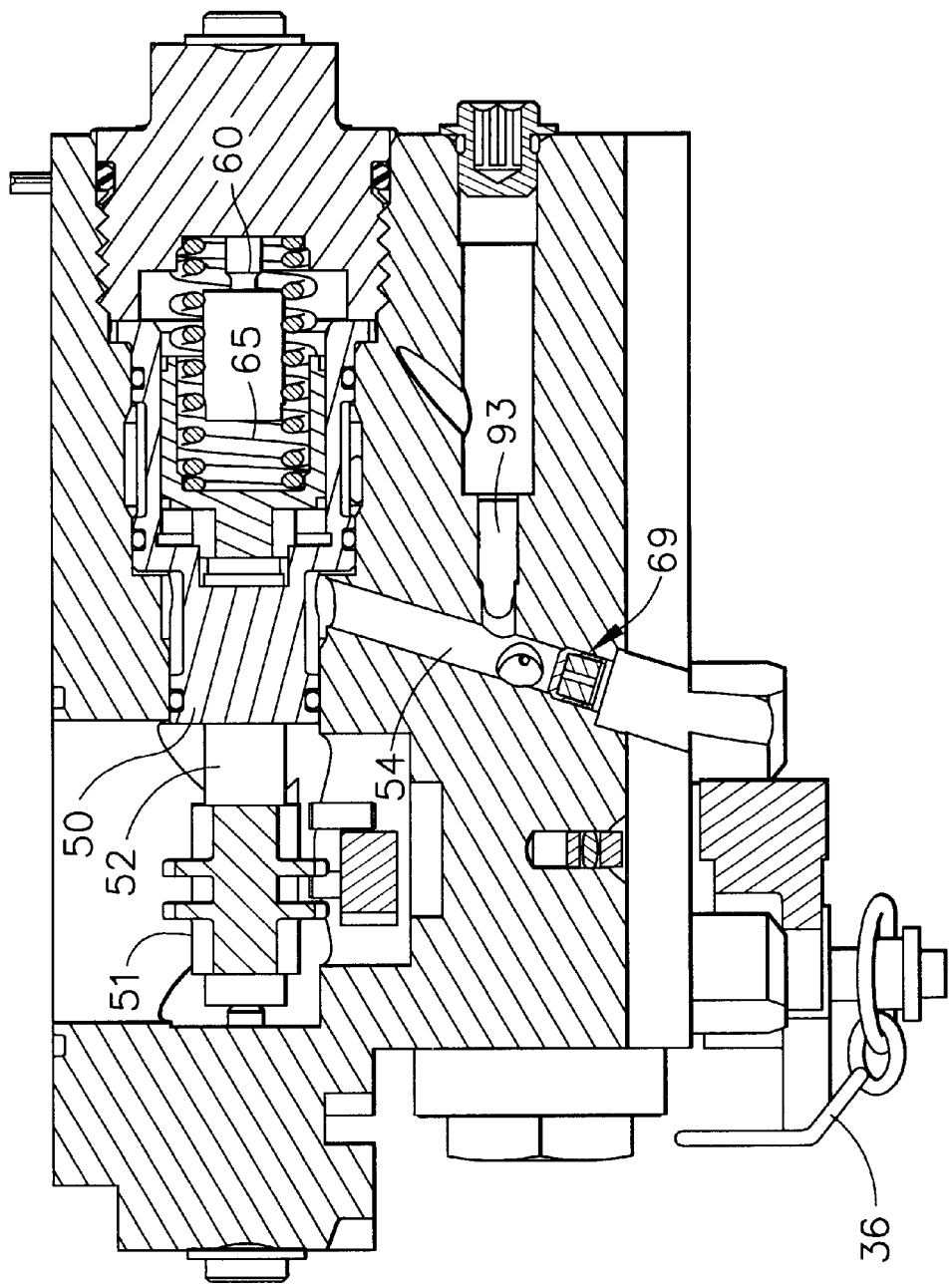
FIG. 8 is a cross-sectional view taken along line 4—4 in FIG. 7.
Figure 9:
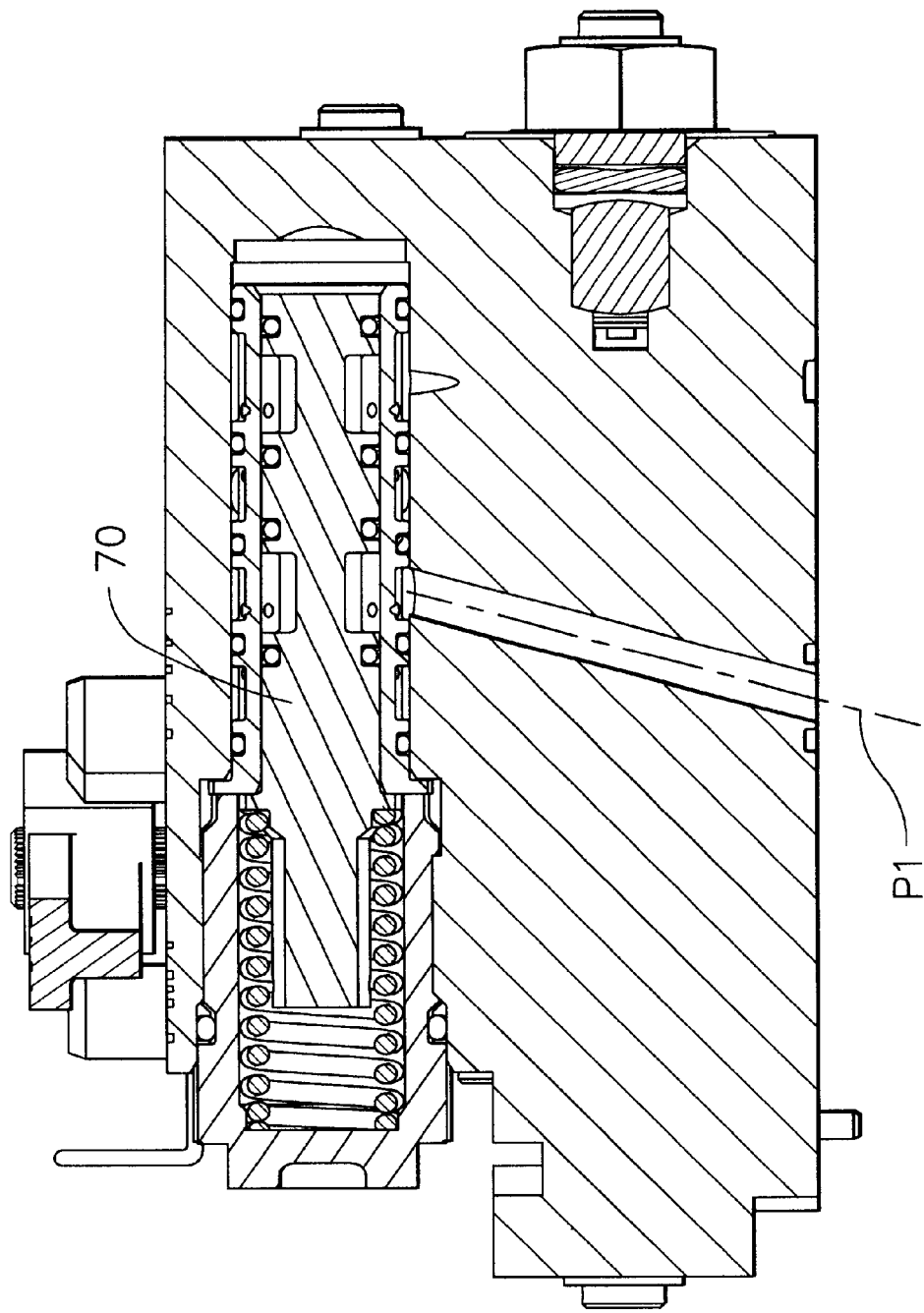
FIG. 9 is a cross-sectional view taken along line 5—5 in FIG. 7.
Figure 10:
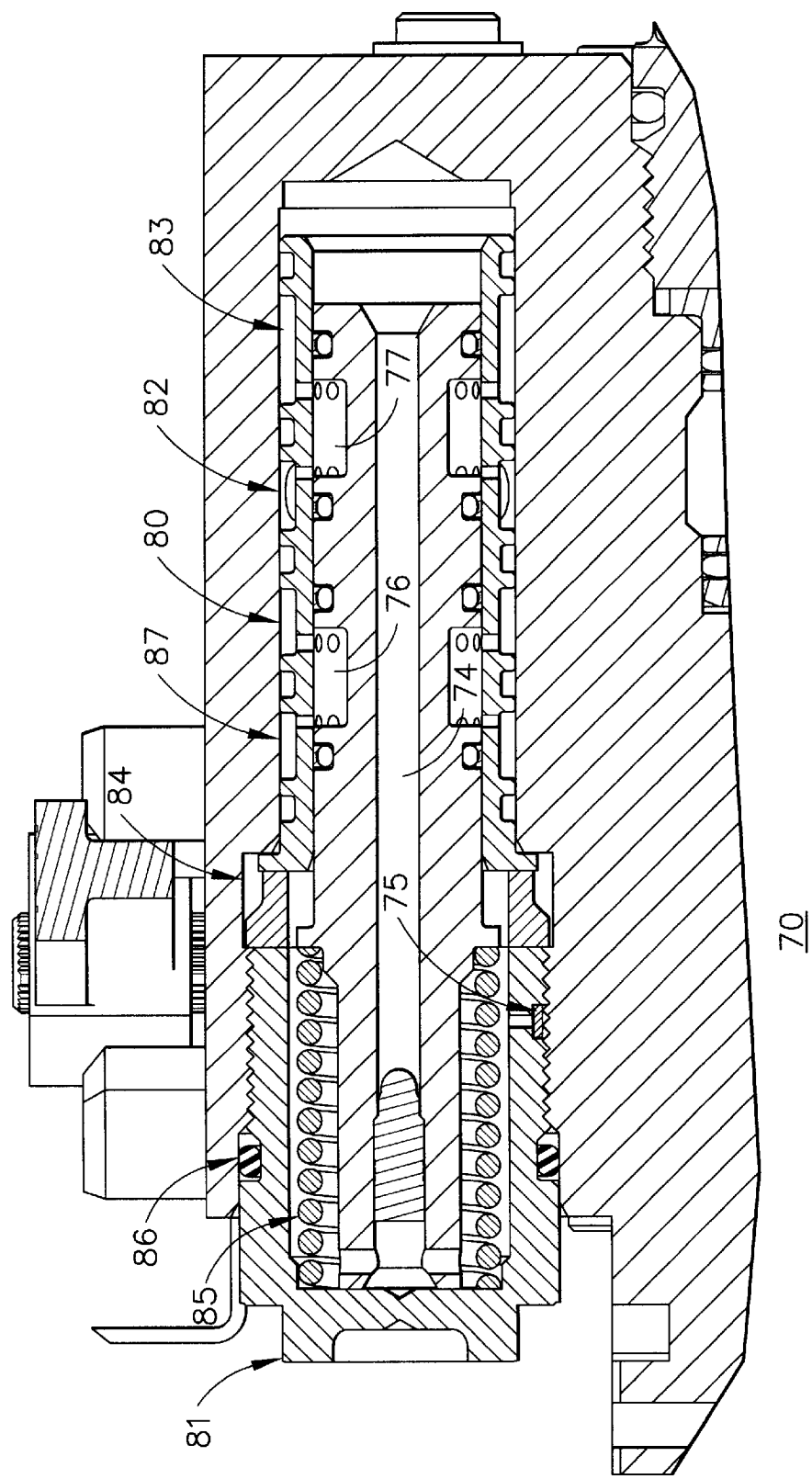
FIG. 10 is a cross-sectional view of the battle override valve of the present invention taken along line 6—6 in FIG. 7 during a bypass operating state.
Figure 11:
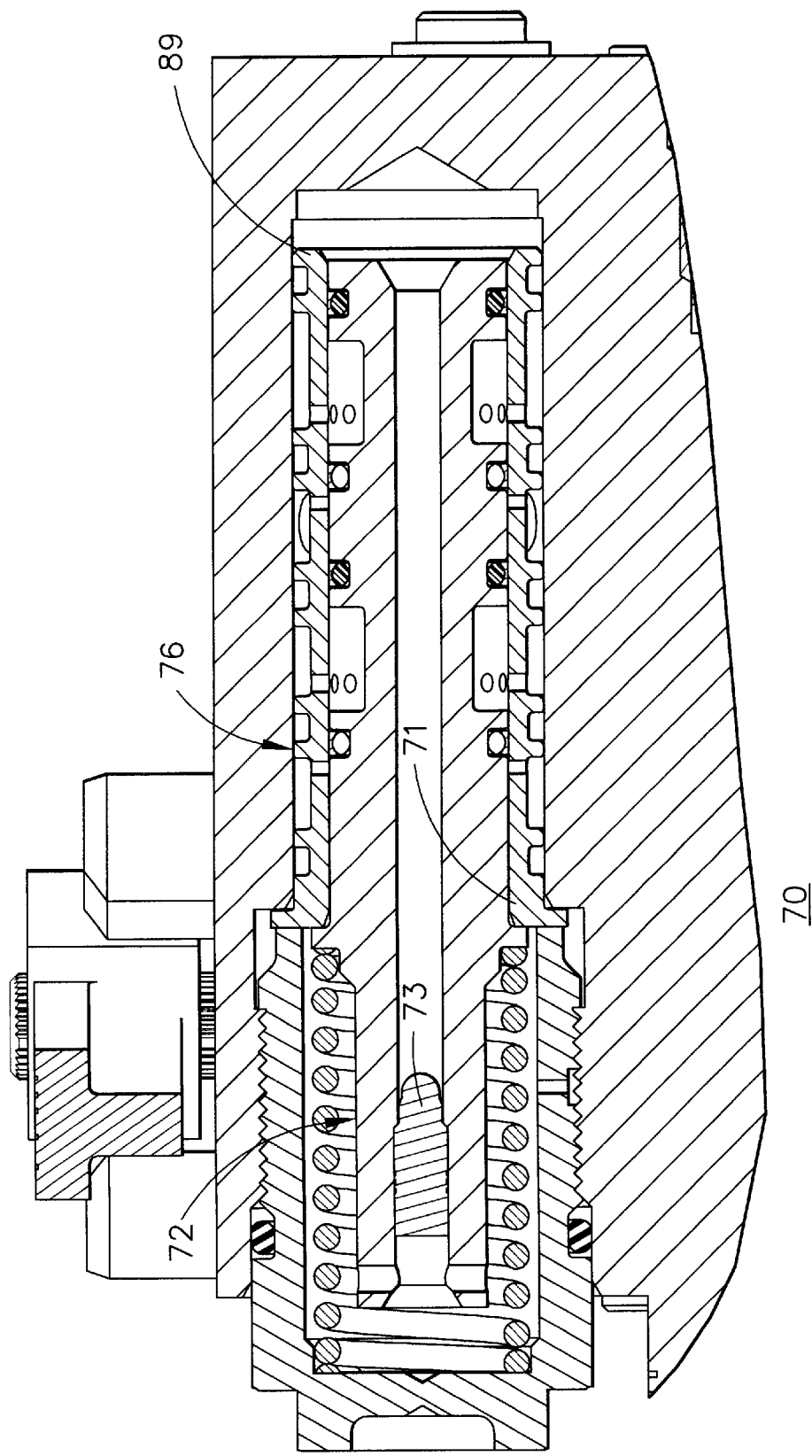
FIG. 11 is a cross-sectional view of the battle override valve of the present invention taken long line 6—6 in FIG. 7 during a normal operating state.
Figure 12:
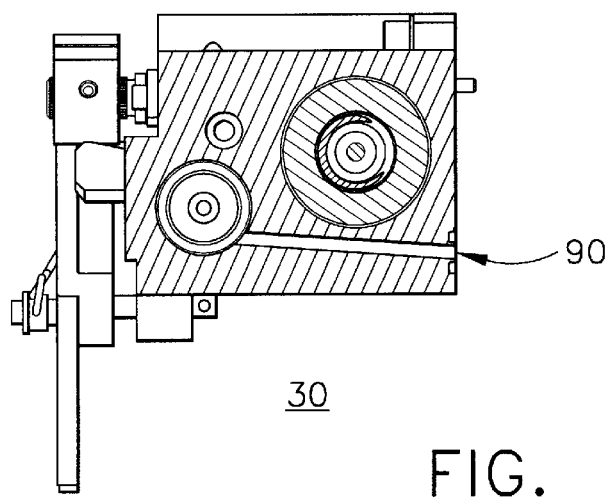
FIG. 12 is a cross-sectional view of the battle override valve of the present invention taken along line 7—7 in FIG. 7.
Figure 13:
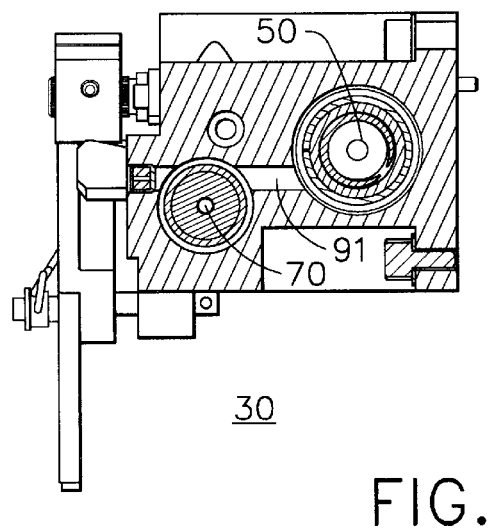
FIG. 13 is a cross-sectional view of the battle override valve of the present invention taken along line 8—8 in FIG. 7.
Figure 14:
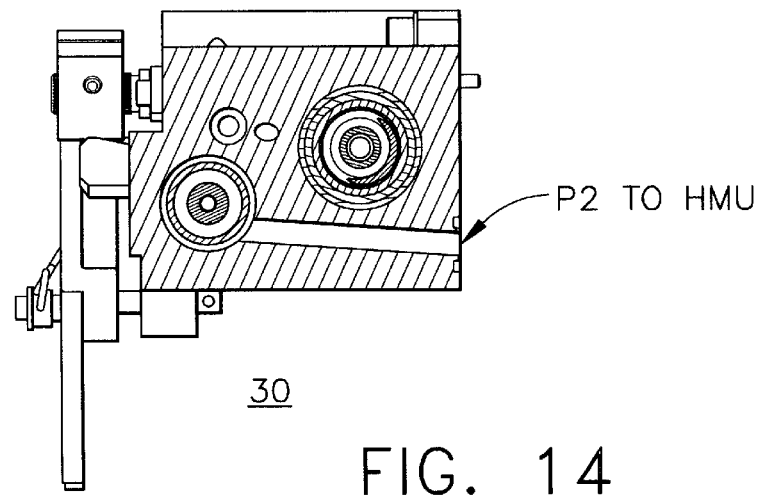
FIG. 14 is a cross-sectional view of the battle override valve of the present invention taken along line 9—9 in FIG. 7.
Figure 15:
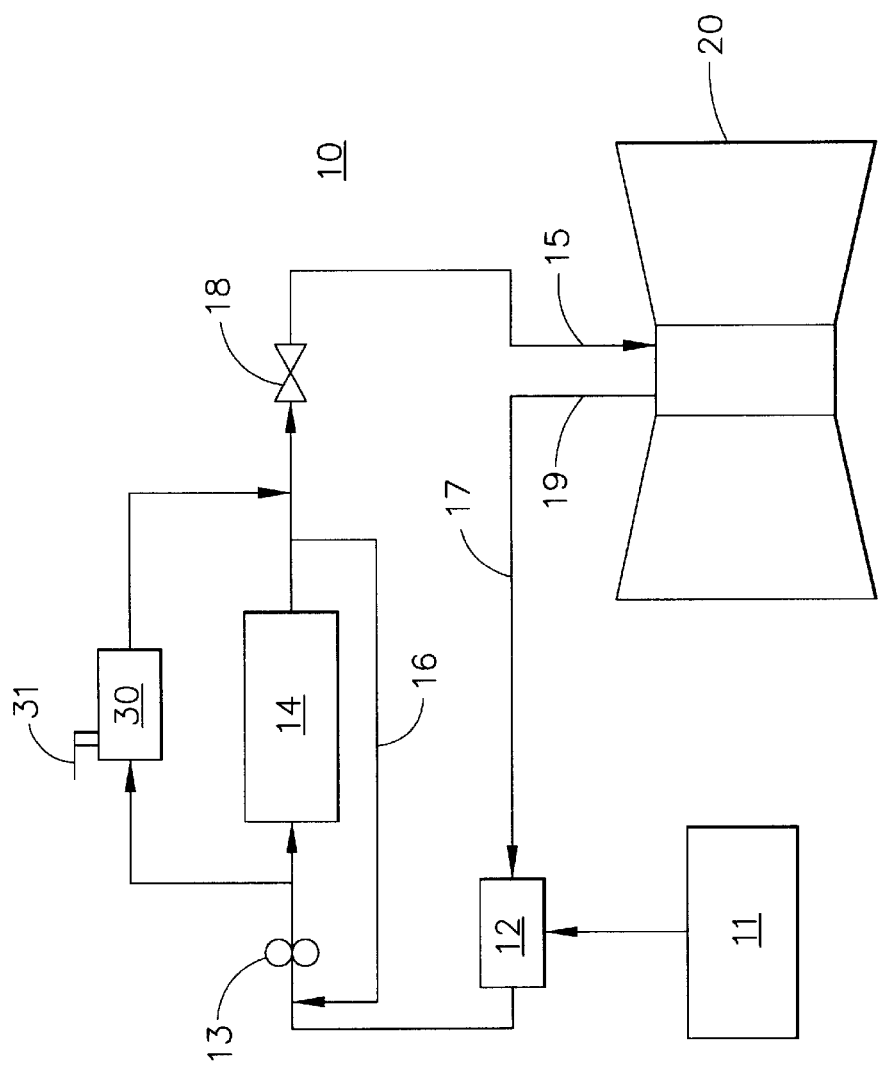
FIG. 15 is a schematic view of an exemplary fuel control system for a turbine incorporating the battle override valve of the present invention.

FIG. 7 is a plan view of the battle override valve of the present invention shown in FIG. 1. FIG. 8 is a cross-sectional view taken along line 4—4 in FIG. 7. FIG. 9 is a cross-sectional view taken along line 5—5 in FIG. 7. FIG. 10 is a cross-sectional view of the battle override valve of the present invention taken along line 6—6 in FIG. 7 during a bypass operating state. FIG. 11 is a cross-sectional view of the battle override valve of the present invention taken long line 6—6 in FIG. 7 during a normal operating state. FIG. 12 is a cross-sectional view of the battle override valve of the present invention taken along line 7—7 in FIG. 7. FIG. 13 is a cross-sectional view of the battle override valve of the present invention taken along line 8—8 in FIG. 7. FIG. 14 is a cross-sectional view of the battle override valve of the present invention taken along line 9—9 in FIG. 7. FIG. 15 is a schematic view of an exemplary fuel control system for a turbine incorporating the battle override valve of the present invention.

An exemplary fuel control system 10 for a military tank engine 20 is shown in FIG. 15. However, one of skill in the art will appreciate that the present invention is equally applicable to all types of engine fuel systems that can benefit from the inclusion of a manual, bypass fuel control device or battle override valve, including but not limited to fuel systems for spark ignition, compression ignition, and gas turbine engines and for fuel burner assemblies for furnace and related combustion devices. The exemplary system 10 includes a fuel supply 11, e.g., a fuel service tank, a fuel manifold 12, a fuel pump 13 (or comparable pressurized fuel supply source), an electronically controlled fuel control unit 14 (ECFCU hereinafter) and a battle override valve 30. Although the term "battle" override valve will be used hereinafter with respect to the following embodiments, it will be appreciated that any bypass fuel control device incorporating the features of the present invention is within the spirit and scope of the present invention.

The battle override valve 30 is provided in a position downstream of the pump 13 and in a parallel flow arrangement with the ECFCU 14. The ECFCU includes or is controlled by an electronic control unit (ECU not shown) that maintains a steady supply of fuel to an intake 15 of the tank engine 20 during normal engine operation. Both the battle override valve 30 and the ECFCU 14 discharge to a common discharge as seen in FIG. 11.

Fuel is delivered to the fuel intake 15 via the necessary valves (only one shown) and piping. However, one of skill in the art will appreciate that the size, number and type of valves and piping employed in the applicable fuel system will vary according to fuel type, engine type and system requirements. As seen in FIG. 15, it may also be advantageous to include fuel recirculation lines 16, 17 for delivering overpressurized or excess fuel to either of the pump inlet 13 or back to the fuel manifold 12, respectively. However, it will be appreciated by one of skill in the art that the schematic view of FIG. 15 merely depicts a single embodiment of an exemplary fuel system. For example, the inlet and outlet lines extending to the battle override valve 30 from the ECFCU 14 may be directly connected to the ECFCU 14, instead of upstream and downstream of the ECFCU 14 as shown in FIG. 15.

The fuel recirculation line 17 leading back to the fuel manifold 12 may be connected to a fuel outlet 19 of the tank engine, e.g. for recycled or unused fuel. However, in a preferred embodiment, the fuel recirculation line 17 and fuel outlet 19 of the tank engine would likely not be required in system for a military tank. Although a recirculation line 16 is shown operatively connected to a discharge side of the ECFCU 14 and the inlet side of the pump 13, this arrangement can be modified to provide overpressure protection or fuel recirculation capabilities as desired, and/or eliminated altogether.

The battle override valve 30 is manually controlled from a remote or local location by a control lever 31 and/or other mechanical linkage (not shown but providing remote operation) between the lever 31 and a valve housing 32. An optional cutoff valve 18 may also be provided immediately downstream of the ECFCU 14 and the battle override valve 30 for shutting off fuel to the engine 20 when the engine stops. The ECU can control the operation of the ECFCU 14 and the cutoff valve 18, if installed.

The basic operation of the fuel control system of the present invention is similar to that of the background art systems for military vehicles, such as that described in the U.S. Pat. No. 4,893,599, discussed and incorporated by reference hereinabove, to Melnik et al. When the ECU receives signals indicative of conditions potentially dangerous to the engine 20, the ECU typically initiates a protective mode wherein it permits only a minimum or threshold level of fuel to pass through the ECFCU, thereby safeguarding the engine from damage. Likewise, if the ECU is disabled or electrical power to the flow control means is interrupted, the flow control means reverts to a default mode wherein this same minimum or threshold amount of fuel is delivered to the engine 20. If it is desired to increase the amount of fuel to the engine 20 under these conditions, then the bypass valve 30 may be opened/operated to the desired degree.

The present inventors have determined that the bypass fuel control mechanisms of the background art suffer from another distinct disadvantage. Specifically, if an operator operates the control lever 31 to initiate bypass fuel control operations of the fuel system 10, severe engine overheating and/or overspeeding can take place if the lever is quickly operated to an extreme operating position, e.g. the operator immediately slams the control lever to a full bypass fuel control operating position when shifting to manual control.

Accordingly, the present inventors have determined that it would be advantageous to include a rate limiting function into a bypass flow control device that retards/controls the rate of fuel flow through the bypass valve during operation, e.g. produces a ramping up or down of fuel flow to the engine when the control lever 31 is shifted through its operable range. This rate limiting function provides a smoother transition to manual fuel control and permits more gradual transitions between engine operating speeds and accordingly prevents rapids changes in operating temperatures.

FIG. 1 is an isometric view of a battle override valve according to an embodiment of the present invention. FIG. 2 is an isometric view of a metering valve portion of the battle override valve shown in FIG. 1. FIG. 3(a) an end view of the battle override valve shown in FIG. 1. FIG. 3(b) is a plan view of the battle override valve shown in FIG. 1. FIG. 3(c) is a side view of the battle override valve shown in FIG. 1.

As seen in FIGS. 1–3, the battle override valve 30 generally includes a housing 32, a control lever 31, a lanyard pin 36, a metering valve 50 and a transfer valve 70 (only a transfer valve cover 81 shown here, see FIG. 9 for greater detail of transfer valve 70). The lanyard pin 36 forces the operator to remove the pin 32 before shifting and/or operating in manual operating control (e.g., battle override or bypass fuel control). As aforementioned, the battle override valve 30 is independent of the ECU and is manually actuated by the mechanical linkage and/or control lever 31. This ensures that the battle override valve 30 is unaffected by the ECU's protective mode or power failure to the ECU.

The battle override valve 30, also referred to as a battle override valve, of the present invention provides preventative control features such as the rate limiting feature during the manual/bypass fuel control operation that prevents an inexperienced operator from spooling the engine 20 up too fast (or down too slowly) when shifting between manual and automatic (normal) fuel control. This rate limiting effect of the battle override valve 30 prevents the engine 20 from overspeeding and/or overheating when the operator shifts the control lever 31 to an extreme operating position (max. fuel flow). The engine will consequently only increase or decrease so fast because of a unique rate limiting function of the metering valve 50. The fuel transfer function of the battle override valve 30 is provided by the transfer valve 70. The transfer valve prevents simultaneous operation of the battle override valve 30 with the automatic fuel control provided by the ECFCU 14.

Metering Valve

FIG. 2 is an isometric view of the metering valve 50 of the present invention. The control lever 31, a control shaft 33, input lever 34 and control pin 35 are also shown for controlling the operation of the metering valve 50. As seen in FIG. 1, a plug 61 for covering an internal access port is provided on an end of the metering valve 50. FIG. 3(a) through FIG. 3(c) are end, plan and side views, respectively, of the battle override valve 30. A plug 82 providing access to one of the rate limiting bleeds and a metering valve cover 62 are also provided for providing access to the interior of the battle override valve 30 as seen in FIG. 3(c).

FIG. 4 is a cross-sectional view of a metering valve portion of the present invention taken along line 3—3 in FIG. 3(c). FIG. 5 is a cross-sectional view of a metering valve portion of the present invention taken along line 1—1 in FIG. 3(b) during a maximum fuel flow stop operating position. FIG. 6 is a cross-sectional view of a metering valve portion of the present invention taken along line 1—1 in FIG. 3(b) during a minimum fuel flow stop operating position.

As seen in FIG. 4 through FIG. 6, the metering valve 50 includes a spool 51, a sleeve valve 52, a cartridge type bleed 53, a high pressure inlet port 54, a low pressure bleed port 55, and a metered flow outlet port 56. A bleed passage 57 and a bleed outlet 58 are provided in fluid engagement with the bleed plug 53 and the low pressure bleed port 55. A pair of adjustment stop screws, including a high flow metering valve adjustment screw 60 and a low flow adjustment screw 64 (positioned inward from the plug 61) allow for adjustment of the metering valve 50 during operation. A helical compression spring 65 is sized and fitted to provide a desired spring force to offset hydraulic pressure experienced by the moving parts of the metering valve 50, e.g., spool 51 and sleeve valve 52.

FIG. 5 is a cross-sectional view of a metering valve portion of the present invention taken along line 1—1 in FIG. 3(b) during a maximum fuel flow stop operating position. FIG. 6 is a cross-sectional view of a metering valve portion of the present invention taken along line 1—1 in FIG. 3(b) during a minimum fuel flow stop operating position. The operation of the metering valve 50 will discussed hereinafter with specific reference to these drawings.

When an operator turns the control lever 31, the control shaft 33 transfers the motive force to the input lever 34 and control pin 35 that engages with the spool 51. As seen in FIG. 6, considering an initial operating position of a minimum flow, e.g. the metered flow outlet port 56 is nearly entirely isolated from the flow of fuel from the high pressure inlet port 54. The rotation of the control lever 31 causes the control pin 35 to move towards the right (in FIG. 5 and FIG. 6) and accordingly forces the spool 51 and sleeve valve 52 toward the right.

As the sleeve valve 52 moves toward the right (as shown in FIG. 5 and FIG. 6), a cylindrical, spring receiving portion 59 of the sleeve valve 52 forces a compression of the spring 65. The spool 51 and sleeve valve 52 will move toward the right until the hydraulic forces acting upon the left and right sides of the cylindrical, spring receiving portion 59 are hydraulically balanced. This position is achieved in the maximum flow position shown in FIG. 5, e.g., the metered flow outlet port is receiving the maximum flow of fuel for discharge to the engine 20 and engine inlet 15.

Movement of the spool 51 and sleeve valve 52 to the right is further limited by the positioning of the adjustment screw 60. The adjustment screw 60 is a mechanical stop that does not cut off any servo flow on the head end of the piston. The sleeve valve 52 follows the spool 51 because it is opening, e.g., bleeding to low pressure, and closing, e.g., allowing high pressure to build, the orifice 58. The first rate limiting bleed 53 is a rate limiting bleed that determines the slew rate of the metering valve.

The low pressure bleed port 55 is a region of low pressure that ensures that fuel always flows towards this region of the valve through the sleeve valve 52. As the spring 65 is compressed, a rate limiting pressure region 58 is relieved via the low pressure bleed assembly of the metering valve 50. The bleed plug 53 and respective bleed passages are specifically sized to provide a desired bleed or slew rate through the bleed passage 57 and bleed outlet 58. This slew rate provides a rate limiting effect during the operation of the battle override valve 30 and its respective control by an operator with the control lever 31.

The spring 65 is sized and selected in order to affect the slew rate and responsiveness of the metering valve 50 as well. It will be appreciated that the specific diameters, shape, and related dimensions of the metering valve's low pressure bleed components (and spring) can be varied to achieve and/or accommodate a variety of flow rates, desired rate limiting effects and fuel types. For example, the metering valve is anticipated to operate within a metered fuel flow rate of between 80 and 400 lbs/hour of fuel in a preferred embodiment.

The high pressure region of the metering valve occurs between the high pressure inlet port 54 and the metered flow outlet port 56. The lowest pressure in the system occurs in the region of the low pressure bleed port 55. A control or rate limiting pressure region 58 provides a counterbalancing effect (along with the spring 65, lead bleed plug 53 and adjustment screw 60 setpoint) against the movement of the sleeve valve 52 to the right, e.g., against the high pressure fuel in the region between the high pressure inlet port 54 and the metered flow outlet port 56. In a preferred embodiment, a minimum flow rate is provided so that if an operator transfers into the backup mode, a preset minimum flow rate is provided before the operator even moves the control lever 31. This arrangement prevents the engine from being starved by an inadequate fuel flow during transition from normal to backup fuel control.

Transfer Valve

FIG. 7 is a plan view of the battle override valve of the present invention shown in FIG. 1. FIG. 8 is a cross-sectional view taken along line 4—4 in FIG. 7. FIG. 9 is a cross-sectional view taken along line 5—5 in FIG. 7. FIG. 10 is a cross-sectional view of the battle override valve of the present invention taken along line 6—6 in FIG. 7 during a bypass operating state. FIG. 11 is a cross-sectional view of the battle override valve of the present invention taken long line 6—6 in FIG. 7 during a normal operating state. FIG. 12 is a cross-sectional view of the battle override valve of the present invention taken along line 7—7 in FIG. 7. FIG. 13 is a cross-sectional view of the battle override valve of the present invention taken along line 8—8 in FIG. 7. FIG. 14 is a cross-sectional view of the battle override valve of the present invention taken along line 9—9 in FIG. 7. FIG. 15 is a schematic view of an exemplary fuel control system for a turbine incorporating the battle override valve of the present invention.

The transfer valve 70 serves as an intermediate control between the metering valve 50 and the remainder of the fuel control system 10. Specifically, in the operating position shown in FIG. 11, the transfer valve 70 is in a normal operating state, e.g. fuel flow to the metering valve 50 is prevented. In the bypass operating state, the fuel flow to and from the metering valve 50 passes through the transfer valve 70 to and from the fuel system 10.

The transfer valve 70 includes a transfer sleeve valve 71, a transfer valve shaft 72, a transfer valve bleed plug 73 and a transfer valve bleed passage 74. The transfer sleeve valve 71 is stationary with respect to the battle override valve housing 32. The transfer valve shaft 72 is movable with respect to the transfer sleeve valve 71 and in a longitudinal direction, e.g., the shaft 72 is capable of a reciprocating action within the transfer sleeve valve 71.

A plurality of control ports are provided along the outer circumference of the transfer sleeve valve 71 and the transfer valve shaft 72. It will be appreciated that the flow of fuel to and from the transfer valve 70 is permitted when the control ports of the transfer valve shaft 72 are aligned with the control ports of the transfer sleeve valve 71. The transfer sleeve valve 71 includes a high pressure fuel inlet port 80 accepting fuel from the system 10. Fuel passes from the high pressure fuel inlet port 80 to a high pressure fuel outlet port 87 via a first stage control port 76 of the transfer shaft 72. Fuel leaving the first stage control port 76 passes to the metering valve's 50 high pressure inlet port 54 (see FIG. 8) when these three ports are aligned in the bypass operating position shown in FIG. 10.

Metered fuel leaving the metering valve's 50 metered flow outlet port 56 returns to the transfer valve 70 via a high pressure, metered flow inlet port 82. Alignment with a second stage control port 77 of the transfer valve shaft 72 permits the metered fuel to pass through a high pressure, metered flow outlet port 83 en route to the fuel system 10 for delivery to the engine 20 during a bypass operating state. As seen in FIG. 11, when the transfer valve shaft 72 is positioned so that the first and second stage control ports 77, 78 are not aligned with the ports leading to the metering valve 50, bypass fuel control is prevented. A second rate limiting bleed 93 is shown in FIG. 8, e.g. the first rate limiting bleed 53 already discussed with respect to FIG. 4. The first and second rate limiting bleeds 53, 93 provide bleed rates that limit the battle override valve's 30 metering valve slew rate in the acceleration and deceleration modes at different rates.

The reciprocating action of the transfer valve is controlled by a combination of a low pressure bleed assembly, including the transfer valve bleed plug 73 and the transfer valve bleed passage 74, and the transfer valve spring 85. A control pressure for manipulating the positioning of the transfer valve 70 between the bypass operating position (FIG. 10) and the normal fuel control operating position (FIG. 11) is controlled by a device such as a solenoid, not shown. The solenoid can be set up to trigger a bypass fuel control operation, automatically, in the event of a loss of electric power to the ECFCU 14 in a preferred embodiment.

As seen in FIG. 12, a fuel inlet 90 to the transfer valve 70 permits a flow of high pressure fuel from the fuel system 10 to the battle override valve 30. An intermediate passage 91 is provided for permitting a flow of fuel between the metering valve 50 and the transfer valve 70. A high pressure outlet (labeled as "P2 to HMU"-hydromechanical unit) is provided for permitting a flow of fuel from the battle override valve's 30 transfer valve 70 to the fuel system 10 and the engine 20. Although a transfer valve 70 has been described with respect to a preferred embodiment, it will be appreciated that the metering valve 50 (FIG. 2) can be configured for independent operation and direct control to the fuel system 10, e.g., the fuel system can be directly connected to the high pressure inlet port 54 and the metered flow outlet port 56 of the metering valve 50 if a transfer valve is not employed.

It will be appreciated by one of ordinary skill in the art the present invention is directed toward a manual battle override valve that includes a metering valve operatively connected to a fuel system for an engine; a manual battle override valve having a metering valve and a transfer valve; a fuel system containing either of the aforementioned battle override valves; and a variety of methods of using all of the aforementioned devices and fuel systems in order to provide a reliable, modular manual battle override valve for use with a variety of engines and their associated fuel systems.

What is claimed is:

1. A bypass fuel control device for a manual operation of an engine fuel system comprising:
    a metering valve having a rate limiting device, wherein said rate limiting device provides for control of a fuel delivery rate during an operation of the bypass fuel control device; said rate limiting device further including
        a spool and a sleeve valve device for controlling a metered fuel flow of the metering valve;
        a low pressure bleed assembly within said metering valve; and
        a control spring, wherein said low pressure bleed assembly and said control spring provide a rate limiting effect for controlling said fuel delivery rate.

2. A bypass fuel control device for a manual operation of an engine fuel system comprising:
    a metering valve having a rate limiting device, wherein said rate limiting device provides for control of a fuel delivery rate during an operation of the bypass fuel control device; said rate limiting device further including
        a spool and a sleeve valve device for controlling a metered fuel flow of the metering valve;
        a low pressure bleed assembly within said metering valve, and
        a control spring, wherein said low pressure bleed assembly and said control spring provide a rate limiting effect for controlling said fuel delivery rate; and
    a control lever assembly, wherein said control lever assembly includes a control pin operatively engaging said spool for controlling a position of said sleeve valve device between a maximum metered fuel flow position and a minimum metered fuel flow position during said manual operation.

3. The bypass fuel control device according to claim 1, further comprising at least one metering valve adjustment screw for setting a maximum metered flow position of said metering valve.

4. The bypass fuel control device according to claim 2, further comprising at least one metering valve adjustment screw for setting the maximum metered flow position of said metering valve.

5. The bypass fuel control device according to claim 1, further comprising a cylindrical, spring receiving portion on an end of said sleeve valve device operatively engaging with said spring.

6. The bypass fuel control device according to claim 4, further comprising a cylindrical, spring receiving portion on an end of said sleeve valve device operatively engaging with said spring.

7. The bypass fuel control device according to claim 6, further comprising a high pressure fuel inlet and a metered flow outlet on a high pressure side of said cylindrical spring receiving portion.

8. The bypass fuel control device according to claim 5, further comprising a low pressure bleed region on a low pressure side of said cylindrical spring receiving portion, wherein said low pressure bleed assembly includes a bleed plug, a bleed passage extending longitudinally through said sleeve valve device, and a bleed outlet port.

9. The bypass fuel control device according to claim 6, further comprising a low pressure bleed region on a low pressure side of said cylindrical spring receiving portion, wherein said low pressure bleed assembly includes a bleed plug, a bleed passage extending longitudinally through said sleeve valve device, and a bleed outlet port.

* * * * *